(12) United States Patent
Erickson, Jr. et al.

(10) Patent No.: US 9,887,627 B2
(45) Date of Patent: Feb. 6, 2018

(54) LOW PROFILE POWER CONVERSION SYSTEM FOR ROOFTOP PHOTOVOLTAIC POWER SYSTEMS

(75) Inventors: Robert Warren Erickson, Jr., Boulder, CO (US); Stephen Pisklak, Hockessin, DE (US); Timothy Plum, Midland, MI (US)

(73) Assignees: THE REGENTS OF THE UNIVERSITY OF COLORADO, A BODY CORPORATE, Denver, CO (US); DOW GLOBAL TECHNOLOGIES LLC, Midland, MI (US)

( * ) Notice: Subject to any disclaimer, the term of this patent is extended or adjusted under 35 U.S.C. 154(b) by 287 days.

(21) Appl. No.: 13/698,737

(22) PCT Filed: May 27, 2011

(86) PCT No.: PCT/US2011/038450
§ 371 (c)(1),
(2), (4) Date: Nov. 19, 2012

(87) PCT Pub. No.: WO2011/153106
PCT Pub. Date: Dec. 8, 2011

(65) Prior Publication Data
US 2013/0062958 A1    Mar. 14, 2013

Related U.S. Application Data

(60) Provisional application No. 61/350,300, filed on Jun. 1, 2010.

(51) Int. Cl.
*H02J 1/00* (2006.01)
*H02J 3/00* (2006.01)
(Continued)

(52) U.S. Cl.
CPC ............ *H02M 3/1582* (2013.01); *H02J 1/102* (2013.01); *H02M 7/003* (2013.01); *H02S 20/25* (2014.12);
(Continued)

(58) Field of Classification Search
CPC ...... H02M 7/003; H02M 3/1582; H02M 1/07; Y02B 10/12; Y02B 10/14
(Continued)

(56) References Cited

U.S. PATENT DOCUMENTS 4,942,353 A    7/1990  Herbert et al.
5,555,494 A *  9/1996  Morris .................. H02M 3/337
                                                        363/132

(Continued)

FOREIGN PATENT DOCUMENTS

JP    2000174315 A    6/2000
WO   2009006879 A2   1/2009

OTHER PUBLICATIONS

PCT International Search Report and Written Opinion, PCT/US2011/038450, dated Sep. 13, 2011, 11 pages.
(Continued)

*Primary Examiner* — Rexford Barnie
*Assistant Examiner* — Toan Vu
(74) *Attorney, Agent, or Firm* — Dinsmore & Shohl LLP

(57) ABSTRACT

The disclosed embodiments and principles provide a way to integrate high-efficiency, low-profile power electronics with localized maximum power point tracking (MPPT) into a rooftop shingle-based photovoltaic power system. DC-DC power converters having a height, or profile, as low as ¼ inch for a 200 W power output, are able to be included in a building-integrated photovoltaic (BIPV) roof shingle. The DC-DC power converters increase the relatively low voltage produced by two rows of series-connected photovoltaic
(Continued)

shingles, each including photovoltaic cells, to a high voltage used by a DC-AC inverter. For example, DC-DC power converter increases the voltage produced by two rows of series-connected photovoltaic shingles from several tens of volts to approximately 400 volts. Thus, the DC-DC power converters provide a large voltage step-up using a low profile and with very high efficiency.

7 Claims, 14 Drawing Sheets

(51) Int. Cl.
    *H02M 3/158*     (2006.01)
    *H02M 7/00*     (2006.01)
    *H02S 20/25*     (2014.01)
    *H02J 1/10*     (2006.01)
    *H02M 1/00*     (2006.01)
    *H02J 3/38*     (2006.01)

(52) U.S. Cl.
    CPC ........ *H02J 3/383* (2013.01); *H02M 2001/007* (2013.01); *Y02B 10/12* (2013.01); *Y02B 10/14* (2013.01); *Y02E 10/563* (2013.01); *Y10T 307/707* (2015.04)

(58) Field of Classification Search
    USPC .......................................................... 307/82
    See application file for complete search history.

(56) References Cited

U.S. PATENT DOCUMENTS

| | | | |
|---|---|---|---|
| 6,578,253 B1 * | 6/2003 | Herbert .................. | H01F 27/22 29/602.1 |
| 6,728,118 B1 * | 4/2004 | Chen et al. .................... | 363/24 |
| 2002/0179140 A1 | 12/2002 | Toyomura et al. | |
| 2003/0142513 A1 * | 7/2003 | Vinciarelli .............. | H02J 1/102 363/17 |
| 2004/0125618 A1 | 7/2004 | De Rooij et al. | |
| 2005/0102947 A1 | 5/2005 | McCaskill et al. | |
| 2005/0242916 A1 * | 11/2005 | So ....................... | H01F 27/2804 336/200 |
| 2008/0164766 A1 | 7/2008 | Adest et al. | |
| 2009/0159113 A1 * | 6/2009 | Morimoto .................... | 136/244 |
| 2010/0043319 A1 | 2/2010 | Bennett | |
| 2010/0133911 A1 * | 6/2010 | Williams et al. ............... | 307/82 |
| 2010/0206378 A1 * | 8/2010 | Erickson, Jr. ..... | H01L 31/02021 136/259 |
| 2010/0313501 A1 * | 12/2010 | Gangemi .................... | 52/173.3 |
| 2012/0223584 A1 * | 9/2012 | Ledenev ........................ | 307/82 |

OTHER PUBLICATIONS

Erickson, R., et al., "A Microinverter for Building-Integrated Photovoltaics," Presented at the IEEE Twenty-Fourth Annual Applied Power Electronics Conference and Exposition, University of Colorado, Boulder, CO, USA, Feb. 15-19, 2009, pp. 911-917.

Linares, L., et al., Improved Energy Capture in Series String Photovoltaics via Smart Distributed Power Electronics, Presented at the IEEE Twenty-Fourth Annual Applied Power Electronics Conference and Exposition, University of Colorado, Boulder, CO, USA, Feb. 15-19, 2009, pp. 904-910.

European Patent Office Supplementary European Search Report dated Dec. 22, 2015 in reference to co-pending European Patent Application No. 11790255.1.

* cited by examiner

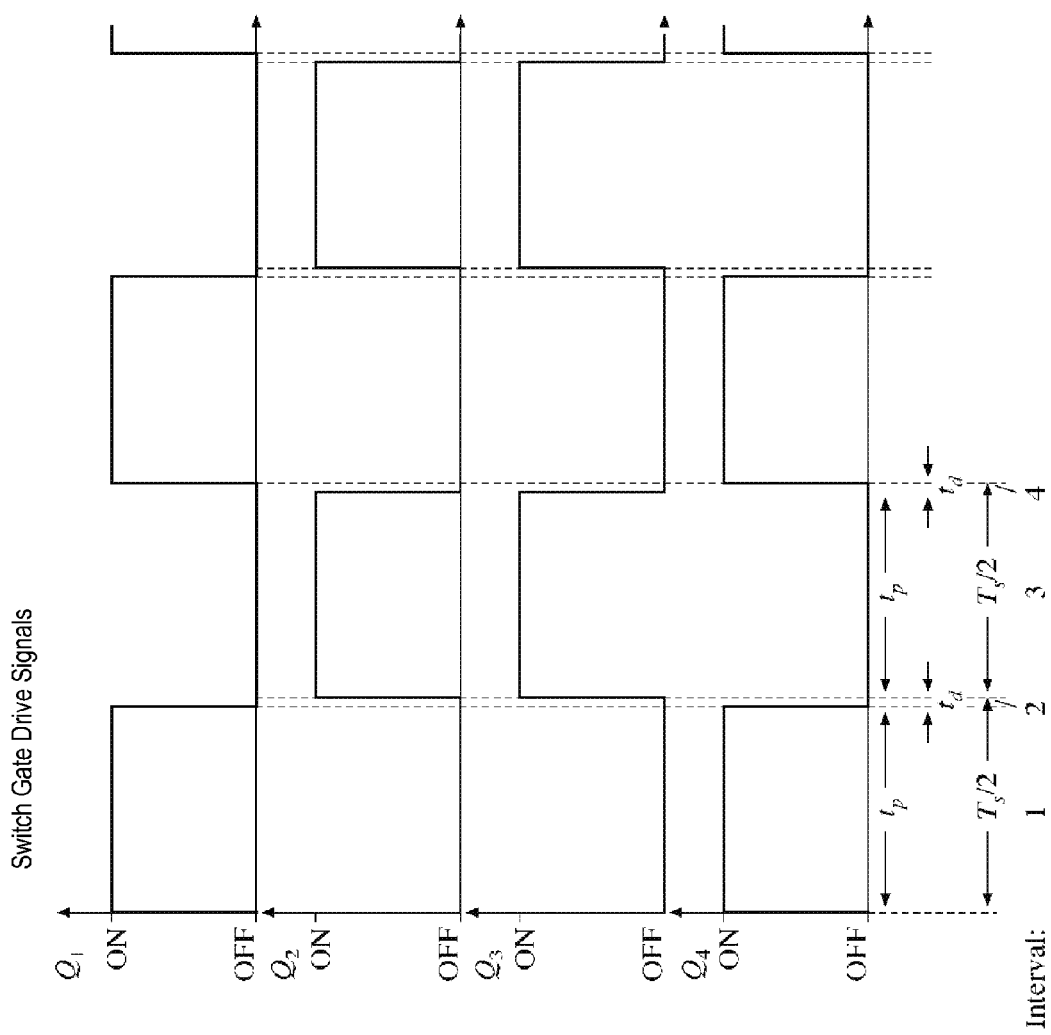

LOW PROFILE POWER CONVERSION SYSTEM FOR ROOFTOP PHOTOVOLTAIC POWER SYSTEMS

BACKGROUND

1. Field of Art

This disclosure relates generally to the field of photovoltaic power systems. More specifically, this disclosure relates to a rooftop shingle-based photovoltaic power system where highly efficient dc-dc converters are included in one or more building-integrated photovoltaic (BIPV) roof shingles.

2. Description of the Related Art

Solar photovoltaic (PV) cells typically produce dc voltages of less than one volt. The amount of electrical power produced by such a cell is equal to its dc voltage multiplied by its dc current, and these quantities depend on multiple factors including the solar irradiance, cell temperature, process variations and cell electrical operating point. It is commonly desired to produce more power than can be generated by a single cell, and hence multiple cells are employed. It is also commonly desired to supply power at voltages substantially higher than the voltage generated by a single cell. Hence, multiple cells are typically connected in series.

For example, consider a conventional rooftop solar power system, such as a 2 kW (grid-tied) rooftop solar PV power system that delivers its power to a 240 V AC utility. Because of the very large number of PV cells required in a conventional rooftop solar power system, the individual PV cells are typically packaged into intermediate-sized panels such as photovoltaic (PV) shingles, which typically include several series-connected PV cells and typically produce several volts DC. PV shingles may be connected in series with the output of the series connected PV shingles connected through a combiner circuit to the input of a central DC-AC inverter, which changes the high DC voltage (e.g., several hundred volts) generated by the series-connected conventional PV shingles into 240 V AC as required by the utility. In addition, the central DC-AC inverter performs certain grid interface functions as required by standards (such as IEEE Standard 1547) and building codes, which may include anti-islanding, protection from ac line transients, galvanic isolation, production of ac line currents meeting harmonic limits, and other functions.

In a conventional system, such as the 2 kW rooftop solar PV power system described above, the DC-AC inverter may include a DC-DC conversion module and an AC interface module. Control circuitry for the DC-AC inverter can implement a maximum power point tracking (MPPT) algorithm, as known in the art. The DC-DC conversion module includes DC-DC conversion circuitry and can serve as a central DC-DC converter for the output of multiple PV shingles. Control circuitry within the DC-AC inverter can control the DC-DC conversion module to adjust the voltage at the input to the DC-AC inverter to maximize the power flowing through the DC-AC inverter. The DC-AC inverter also includes an AC interface module, typically a DC-AC converter, to interface to an AC utility grid.

Because power produced by a PV shingle depends on the voltage and current of the PV shingle and on other factors including solar irradiation and temperature the maximum current that a PV shingle can produce (the "short circuit current") is proportional to the solar irradiation incident on a PV shingle. When PV shingles are connected in series, each of the PV shingles must conduct the same current (the "string current"). If a first PV shingle in a series string is partially shaded, then the current of all PV panels in the string is affected. In some instances, the series string operates with a reduced current determined by the current of the shaded conventional PV shingle, reducing the power generated by all PV shingles in the string. Alternatively, the string may conduct a larger current, causing a bypass diode of the shaded PV shingle to conduct and prevent power from being harvested from the shaded PV shingle, reducing the total voltage produced by the string. In either case, the PV power generation system produces less than the maximum possible power.

Additionally, the DC-DC conversion module included in the DC-AC inverter typically operates with less than 100% efficiency, and some fraction of the power generated by the collection of PV shingles (referred to as a photovoltaic array) is therefore lost.

SUMMARY

The disclosed embodiments and principles provide a way to integrate high-efficiency, low-profile power electronics with localized maximum power point tracking (MPPT) into a rooftop shingle-based photovoltaic power system. DC-DC power converters having a height, or profile, as low as ¼ inch for a 200 W power output, allow these DC-DC power converters to fit inside a building-integrated photovoltaic (BIPV) roof shingle. The DC-DC power converters increase the relatively low voltage produced by two rows of series-connected photovoltaic shingles, each including photovoltaic cells, to a high voltage used by a DC-AC inverter. For example, DC-DC power converter increases the voltage produced by two rows of series-connected photovoltaic shingles from several tens of volts to approximately 400 volts. Thus, the DC-DC power converters provide a large voltage step-up using a low profile and with very high efficiency.

A solar array produced including the low-profile DC-DC power converters and rows of series-connected photovoltaic shingles connected in parallel is tolerant of mismatches such as partial shading or differences in the number of shingles per row. Use of low-profile DC-DC power converters in the solar array allows a flexible installation where an arbitrary number of rows, up to the power rating of the inverter, may be added to the solar array without alteration of the inverter DC input voltage. In one embodiment, the outputs of several DC-DC power converters are connected in parallel to a DC bus, allowing failures to be isolated, so that an open-circuited shingle does not impair performance of the solar array in its entirety.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 6B illustrates the timing of logic signals for one embodiment of a dc transformer.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the Figures and may indicate similar or like functionality. The Figures depict embodiments of the disclosed system (or method) for purposes of illustration only. One skilled in the art will readily recognize from the following description that alternative embodiments of the structures and methods illustrated herein may be employed without departing from the principles described herein.

General Overview

The disclosed embodiments and principles provide a way to increase the power generated by a solar photovoltaic (PV) array, when the PV panels within the PV array are not uniformly illuminated or oriented. The disclosed embodiments and principles also increase the power generated by a solar photovoltaic array in which panels are mismatched (e.g., have varying performance characteristics) and/or operate at non-uniform temperatures. It also provides simpler interconnection and wiring of the elements (e.g., PV shingles) of the array. As a result, the energy generated by the solar PV array is increased, the costs of system design and installation are reduced, and it becomes feasible to install PV arrays in new locations such as on gabled or non-planar roofs.

PV shingles are connected in series, possibly with multiple rows of PV shingles also connected in series. One or more rows of PV shingles are coupled to a DC-DC converter, which is also included in a shingle. In one embodiment, the outputs of multiple DC-DC converters are connected in parallel to a DC bus, which then communicates DC voltage from the DC-DC converters to a DC-AC inverter. Alternatively, the outputs of multiple DC-DC converters may be connected in series to the DC bus. The DC-DC converters have a low-profile, allowing them to be included in a building-integrated photovoltaic (BIPV) shingle and allow the relatively low voltage provided by series connected PV shingles to a higher voltage, such as 200 V or 400 V.

System Architecture

Figure 1:
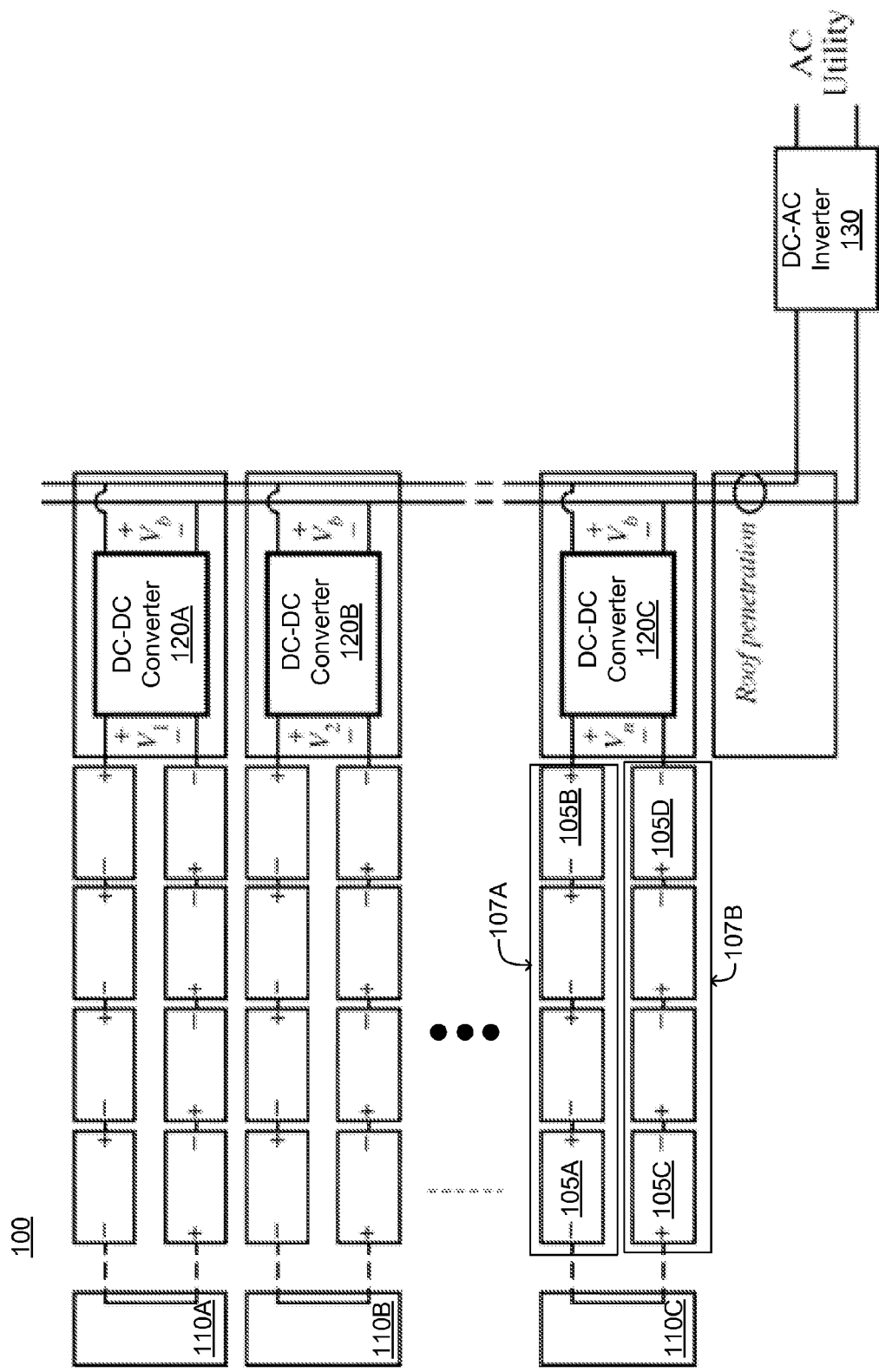
FIG. 1 illustrates one embodiment of a rooftop photovoltaic (PV) power generation system including rows of photovoltaic (PV) shingles coupled to one or more DC-DC converters.

FIG. 1 illustrates one embodiment of a rooftop photovoltaic (PV) power generation system 100 where a plurality of rows 107A, 107B (also referred to individually and collectively as 107) photovoltaic (PV) shingles 105A, 105B, 105C, 105D (also referred to individually and collectively as 105) are connected in series. Each row 107 includes one or more PV shingles 105 connected in series by waterproof connections. In one embodiment, the PV shingles resemble conventional asphalt roof shingles and also include one or more embedded photovoltaic (PV) cells. The configuration of a PV shingle 105 is further described below in conjunction with FIG. 2.

Connector shingles 110A, 110B, 110C (also referred to individually and collectively as 110) connect the PV shingles 105 in adjacent rows 107A, 107B in series, so that two rows form a loop that is coupled to a DC-DC converter 120A, 120B, 120C. In the example of FIG. 1, a negative terminal of a first PV shingle 105A in a first row 107A is coupled to a connector shingle 110C that is also coupled to a positive terminal of a first PV shingle 105C in a second row 107B; thus, the connector shingle 110A forms a loop of series-connected PV shingles from the first row 107A and from the second row 107B.

Each row 107 of PV shingles 105 is coupled to a DC-DC converter 120A, 120B, 120C (also referred to collectively and individually as 120). The DC-DC converter 120A, 120B, 120C is coupled to a DC bus. In one embodiment a DC-DC converter 120 comprises a shingle end piece including a low-profile DC-DC converter that receives the voltage and power generated by a loop of series connected PV shingles 105, and increases the low voltage input $V_1, V_2, V_n$ from the series connected PV singles 105 to a high-voltage $V_b$ used by the DC bus. In one embodiment, each DC-DC converter 120 includes a controller that performs maximum power point tracking, to maximize its input power and hence extract the maximum amount of power from the loop of series-connected PV shingles 105. The controller also performs current limiting, overvoltage limiting, arc fault protection, and shuts down the DC-DC converter 120 when a DC-AC inverter 130 coupled to the DC bus enters anti-islanding or other shutdown or fault modes. In one embodiment, the controller includes feedback algorithms and circuitry for stabilization of the DC-DC converter 120 and/or system DC operating points. The controller may optionally include monitoring and communications to advise an owner or operator of performance and power generation and to enable remote shutdown. The DC-DC converter 120 performs these functions with very high efficiency using a compact size to allow its inclusion in a roof shingle.

The DC bus to which the DC-DC converters 120A, 120B, 120C are coupled is also coupled to a DC-AC inverter 130 which is in a separate physical location than the DC-DC converters 120A, 120B, 120C. For example, when the PV system 100 is included on a roof, the DC-AC inverter 130 is located underneath the roof or at a location near the ground, such as a garage. The DC bus travels through a roof penetration to the input of the DC-AC inverter 130, which generates AC voltage from the DC voltages received from the DC-DC converters 120A, 120B, 120C. In one embodiment, the DC-AC inverter has a fixed-voltage input to optimize the DC-AC inverter 130; the DC-DC converters 120A, 120B, 120C and high-voltage wiring between the components is optimized for a fixed voltage $V_b$ produced by the output of the DC-DC converters 120A, 120B, 120C. The AC voltage output from the DC-AC inverter is transmitted to an AC utility in one embodiment.

Figure 2:
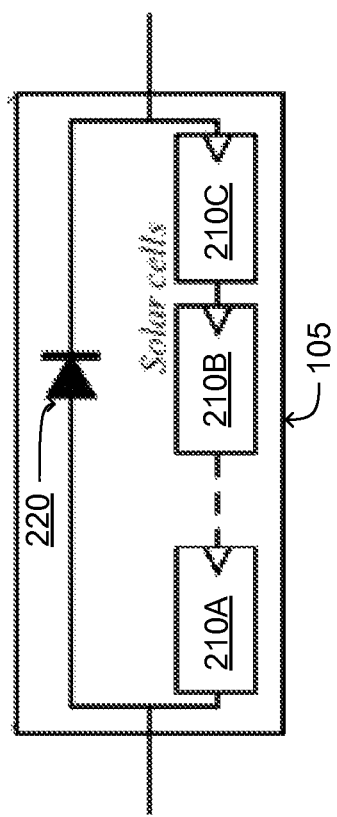
FIG. 2 illustrates one embodiment of a PV shingle.

FIG. 2 illustrates one embodiment of a PV shingle 105. A PV shingle 150 typically includes one or more photovoltaic (PV) cells 210A, 210B, 210C connected in series. In one embodiment, the PV shingle 150 also includes one or more bypass diodes 220. While FIG. 2 shows a single bypass diode 220, in other embodiments, the PV shingle 105 includes a plurality of series-connected bypass diodes 220, each connected in parallel with one or more PV cells 210A, 210B, 210C. A typical PV shingle 105 may produce several volts and several amperes when receiving maximum illumination, such as when receiving maximum solar light at midday.

DC-DC Converter Design

Figure 3:
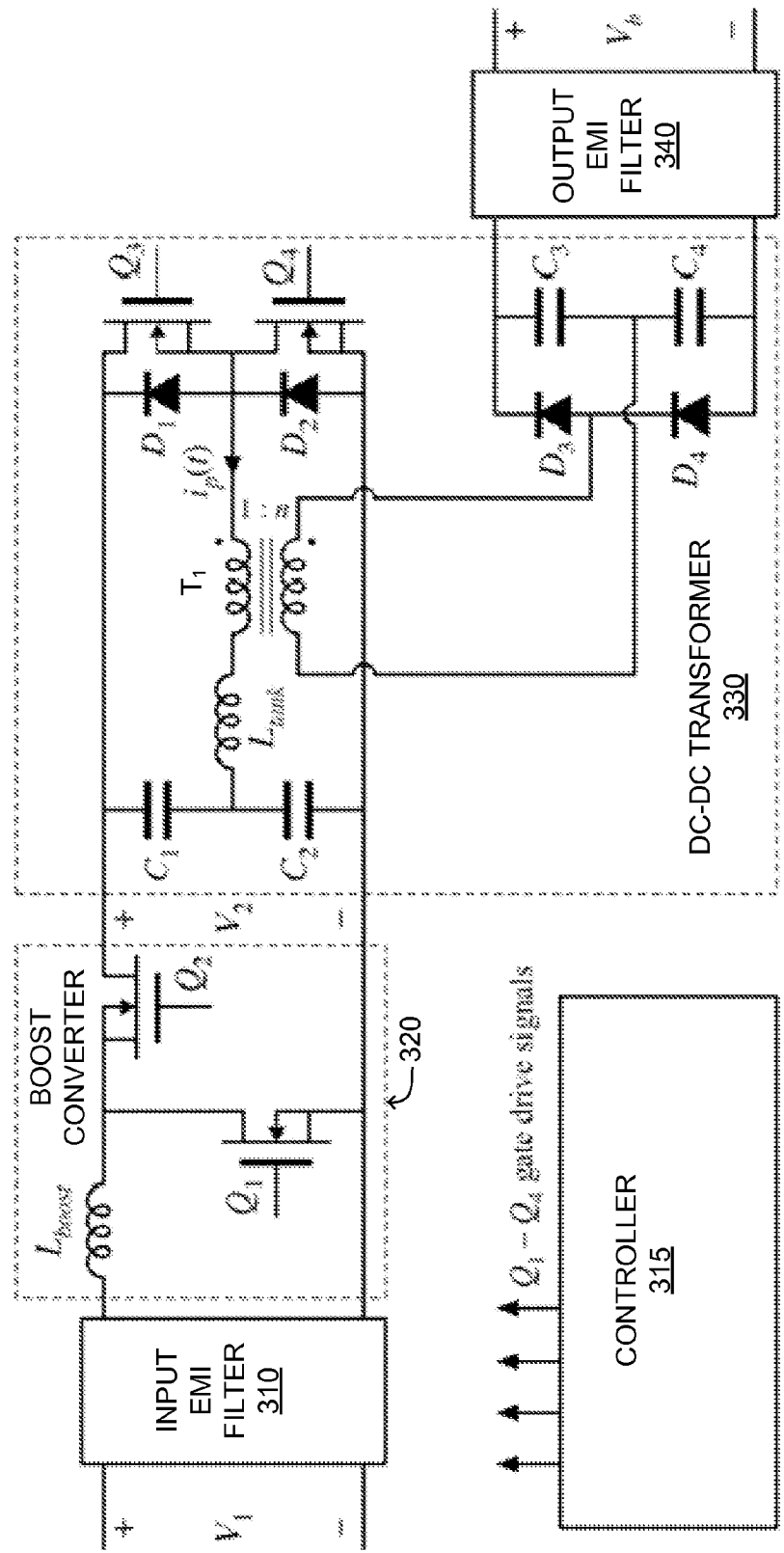
FIG. 3 illustrates one embodiment of the power conversion circuitry of a low-profile DC-DC converter.

FIG. 3 illustrates one embodiment of the power conversion circuitry of a low-profile DC-DC converter 120. The power conversion circuitry shown by FIG. 3 may be used in a DC-DC converter 120 with parallel-connected outputs and performing maximum power point tracking (MPPT). In the embodiment shown by FIG. 3, the DC-DC converter 120 includes an input electromagnetic interference (EMI) filter 310 receiving an input voltage $V_1$ from a loop of series-connected photovoltaic (PV) shingles. The output of the EMI filter 310 is coupled to a DC-DC boost converter 320 that increases the input voltage $V_1$ to an intermediate voltage $V_2$. Typically, the input voltage $V_1$ may vary depending on the number of PV shingles 105 in a series-connected loop, the irradiance, shading profile, and shingle temperatures. However, the intermediate voltage $V_2$ is approximately fixed, and is slightly greater than the maximum expected input voltage $V_1$. In one embodiment, the DC-DC boost converter 320 includes an inductor $L_{boost}$, and two switching devices $Q_1$, $Q_2$, such as two MOSFETs, coupled together as known in the art. A controller 315 is coupled to the DC-DC boost converter 320 and generates control signals adjusting duty cycles of the switching devices $Q_1$, $Q_2$ in the DC-DC boost converter 320 to maximize the DC-DC boost converter 320 converter input power and to perform other control functions as necessary. The controller 315 also generates control signals to operate switching devices $Q_3$, $Q_4$ in the DC transformer 330 further described below.

The DC-DC converter 120 includes a DC transformer 330 which receives the intermediate voltage $V_2$ output by the DC-DC boost converter 320. The DC transformer 330 is configured to step up the intermediate voltage $V_2$ by a large ratio with very high efficiency to produce an output voltage $V_b$. In one embodiment, the DC-DC converter 120 is configured to operate using a substantially fixed voltage conversion ratio $M=V_b/nV_2$ of approximately unity. This configuration allows the DC-DC converter 120 to apply a near-optimum trapezoidal current waveform to the transformer $T_1$ windings, which minimizes the transformer power loss and optimizes the design of the DC-DC transformer 330 for high efficiency in a low profile application. In a typical application with $V_1$=20 to 50 V, the intermediate bus voltage $V_2$ may be chosen as 50 V. If the dc output voltage is a fixed $V_b$=400 V, then the transformer T1 turns ratio should be chosen to be approximately n=8.

As shown in FIG. 3, one embodiment of the DC transformer 330 includes a plurality of capacitors $C_1$, $C_2$, a tank inductor $L_{tank}$, a plurality of switching devices, such as MOSFETs, $Q_3$, $Q_4$ and a plurality of diodes $D_1$, $D_2$ coupled to the primary winding of the transformer $T_1$ and a plurality of capacitors $C_3$, $C_4$ and a plurality of diodes $D_3$, $D_4$ coupled to the secondary winding of the transformer $T_1$ as shown in FIG. 3. In one embodiment, the output of the DC-DC transformer 330 is coupled to an output EMI filter 340 that suppresses interference before transmitting the output voltage $V_b$ to the DC bus.

The DC transformer 330 enables the functionality of the PV system 100 described above in conjunction with FIG. 1 by allowing the relatively low voltage $V_1$ generated by a loop of series-connected PV shingles 105 to be stepped up with very high efficiency to the relatively high voltage $V_b$ used by the DC-AC inverter 130. The DC transformer also allows the DC-DC converter 120 to have a significantly reduced profile, which allows the DC-DC to be included in a roof-mounted end-piece shingle. Further details of how the DC transformer 330 circuit achieves high efficiency are discussed below and include zero-voltage switching of the DC transformer 330 diodes and MOSFETs, minimization of DC transformer 330 RMS currents and maximization of the fraction of time that power is transmitted through the MOSFETs from the input terminals and through the DC transformer 330.

Figure 4:
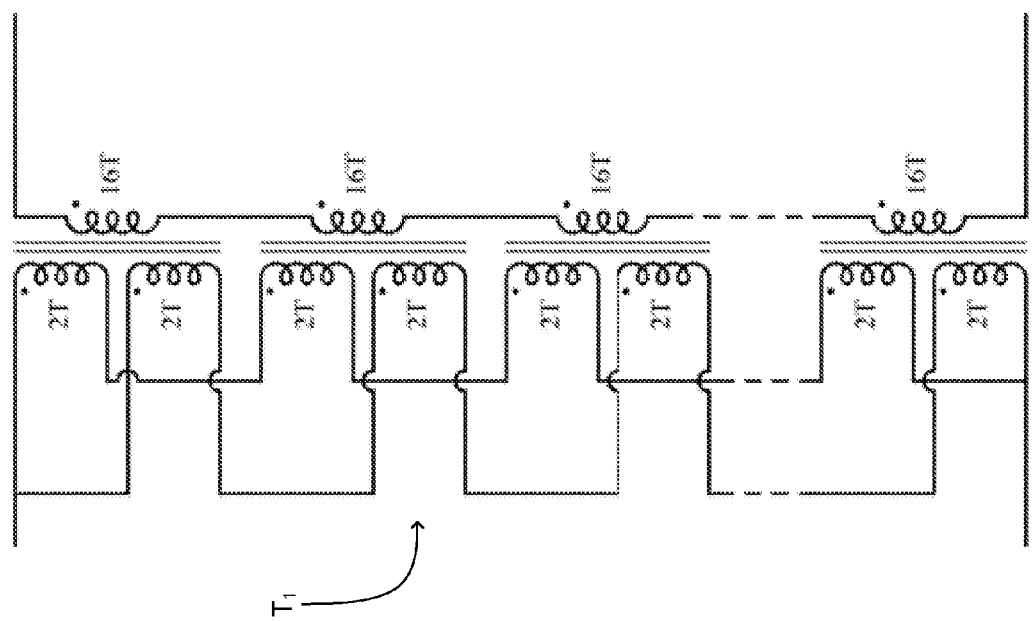
FIG. 4 illustrates one embodiment of a magnetic transformer included in a low-profile DC-DC converter.
Figure 5:
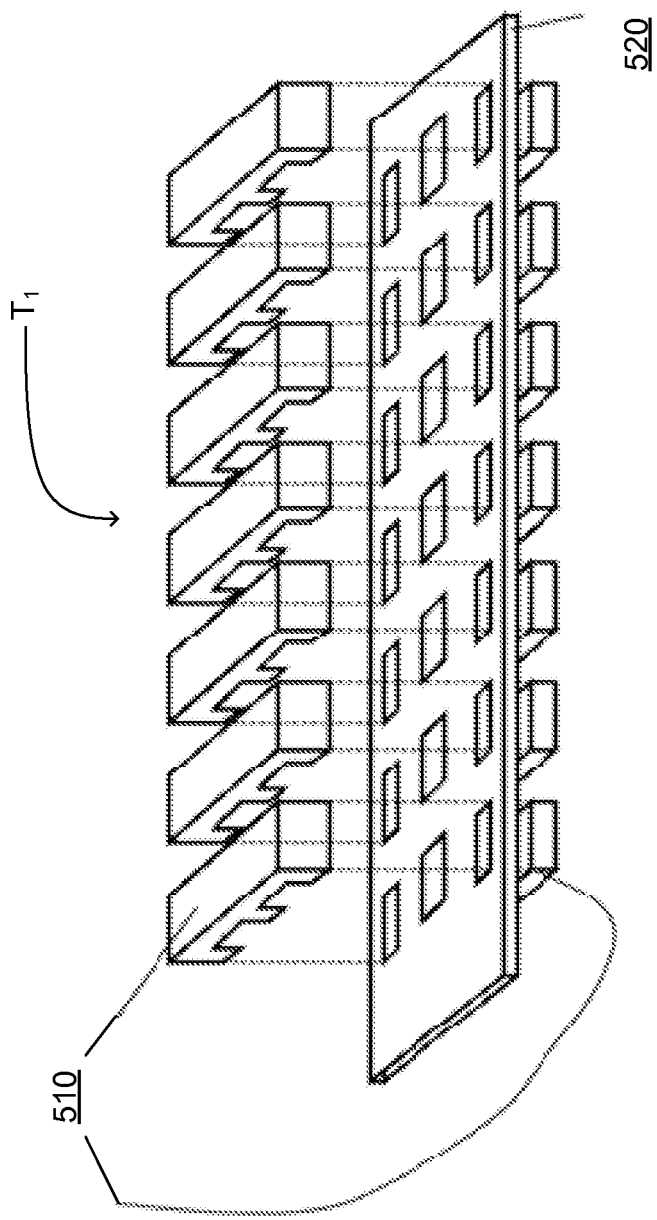
FIG. 5 illustrates one embodiment of a physical structure of a magnetic transformer included in a low-profile DC-DC converter.

FIG. 4 illustrates one embodiment of a magnetic transformer T1 included in a low-profile DC-DC converter 120 while FIG. 5 illustrates an embodiment of the physical structure used to construct the magnetic transformer T1 shown by FIG. 4. For a 200 W application, the magnetic transformer of a conventional 100 kHz switching DC-DC converter 120 is typically one inch tall and cannot fit within the ¼ inch height, or "profile," of a roof shingle. To reduce the profile of the DC-DC converter 120, the magnetic transformer $T_1$ is electrically implemented as shown in FIG. 4 and physically implemented as illustrated in FIG. 5.

As shown in FIG. 5, multiple low profile planar magnetic cores are employed as small transformers, which are connected in a series-parallel arrangement such as the one illustrated in FIG. 5. For example, eight EI-18 planar magnetic cores may be used, each planar magnetic core 510 having two 2T primary windings and one 16T secondary winding. The planar magnetic core 510 comprises two flat pieces of magnetic material with one piece above the windings and one piece below the windings, as shown in FIG. 5. These windings are fabricated on an eight layer printed circuit board 520 having copper thickness of 2.5 oz., and are interconnected as illustrated in FIG. 4. Primary layers of the printed circuit board 520 each contain one turn while secondary layers of the printed circuit board 520 contain four turns each; the primary and secondary layers are interleaved to minimize AC copper losses. This "planar matrix transformer" is approximately ¼ inch tall, and is capable of operating in a DC transformer 330 with very high efficiency. A similar approach can be employed for a 300 W application or for a ⅜ inch profile.

In one embodiment, the inductors $L_{boost}$, $L_{tank}$ used in the DC transformer 330 are also implemented using planar magnetic cores 510 with windings included in a layered printed circuit board 520.

Figure 6A:
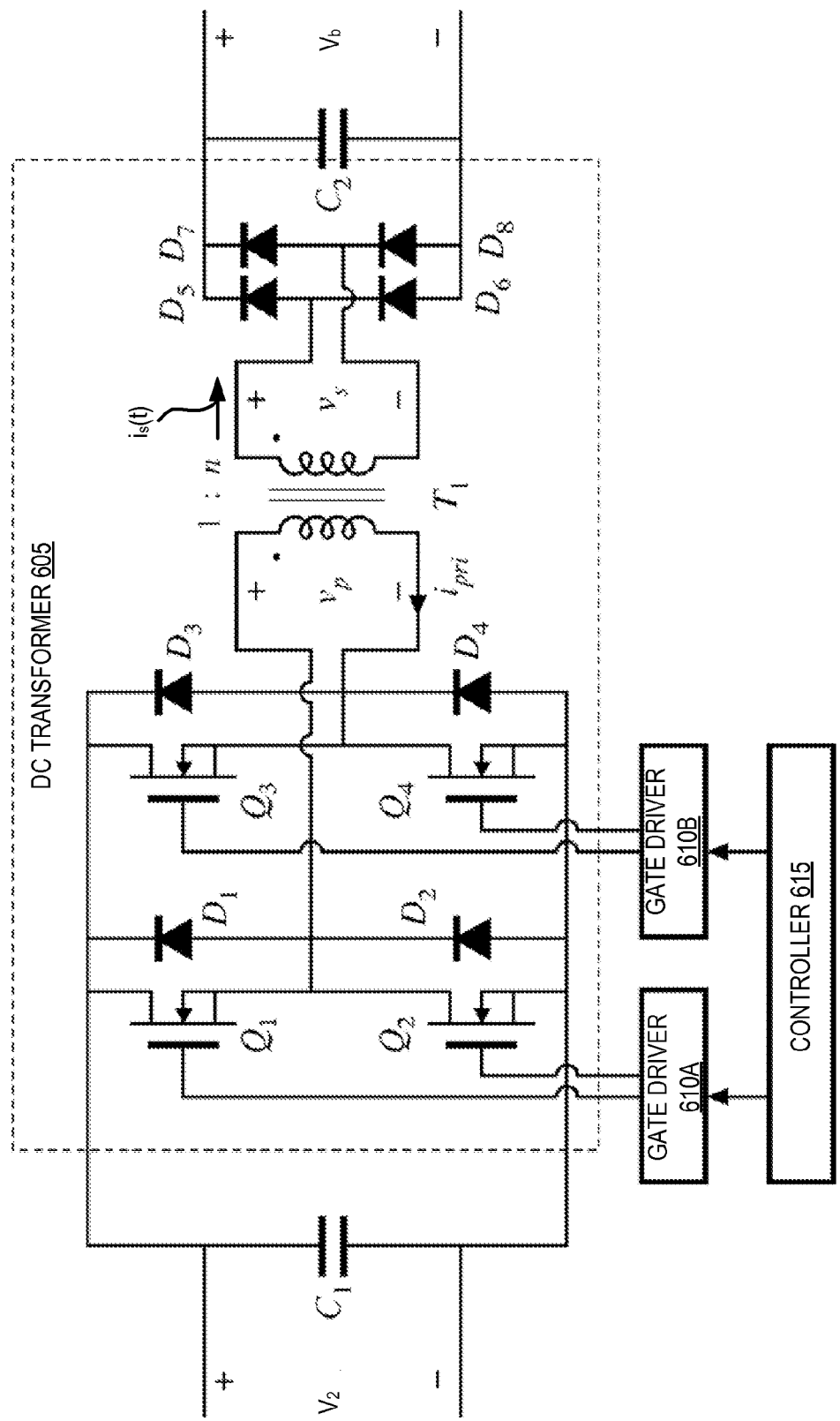
FIG. 6A illustrates one embodiment of a dc transformer used in a low-profile DC-DC converter.
Figure 6C:
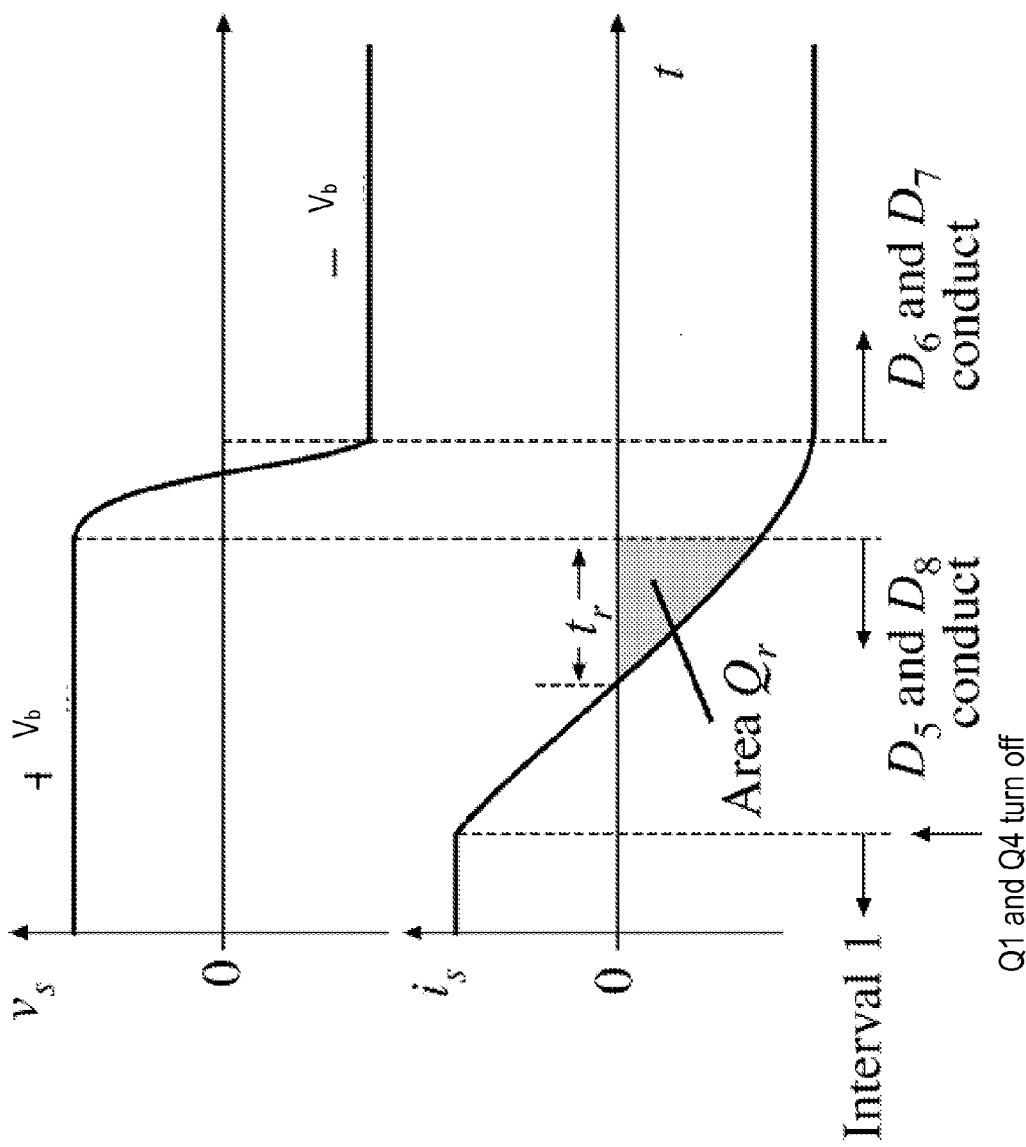
FIG. 6C illustrates magnified switching current and voltage waveforms for secondary-side components included in one embodiment of a dc transformer.
Figure 6D:
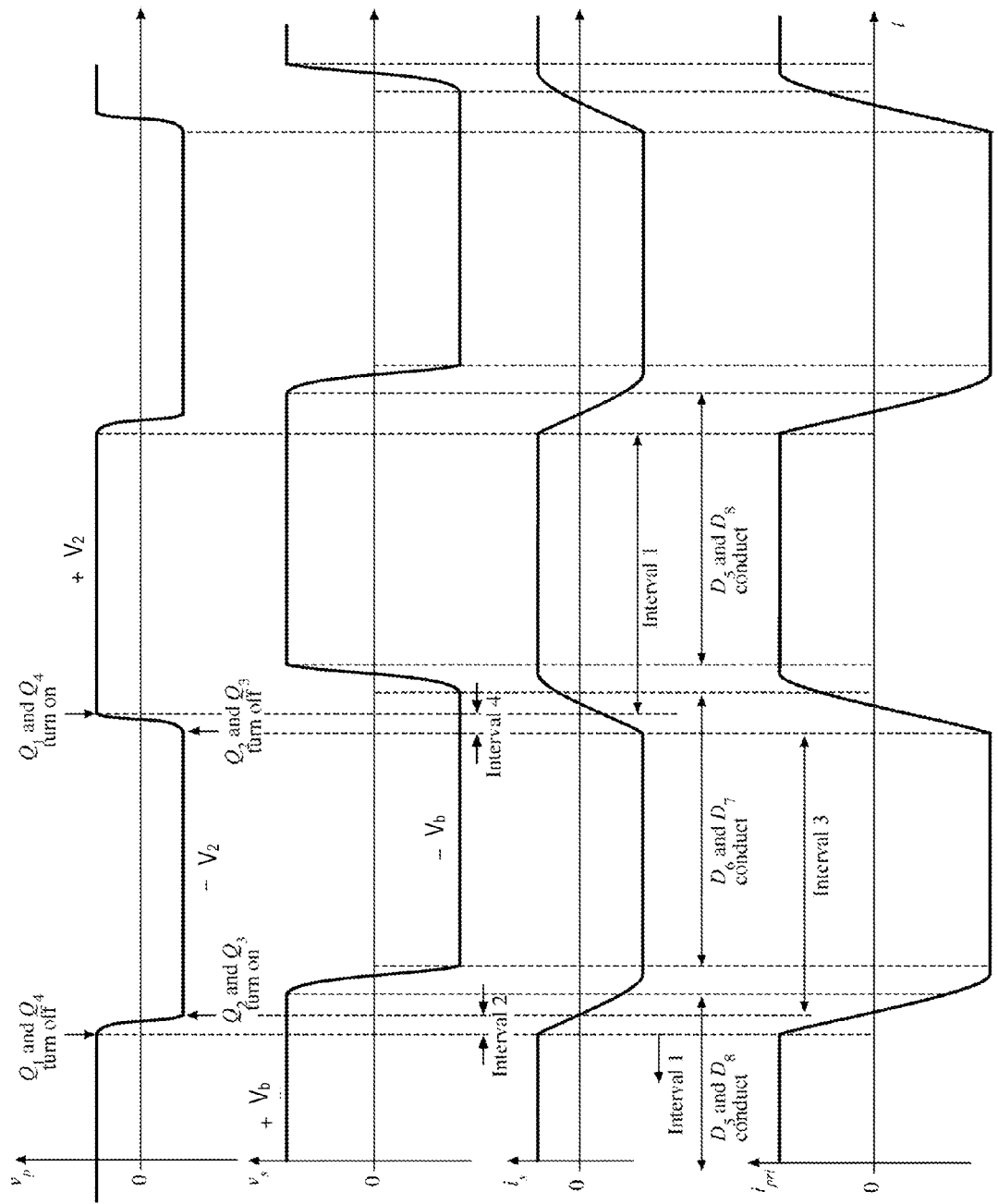
FIG. 6D illustrates switching current and voltage waveforms for primary-side and secondary-side components included in one embodiment of a dc transformer.

FIG. 6A shows one embodiment of a DC transformer 605 for use in a DC-DC converter 120 to illustrate how the DC transformer achieves high efficiency, with FIGS. 6B-6D illustrating various operational characteristics of the DC transformer 605. The DC transformer 605 comprises a high-efficiency step-up DC-DC converter that interfaces a low-voltage loop of series-connected solar photovoltaic panels 105 to a high-voltage dc bus.

One embodiment of the DC transformer 605 has been empirically observed to boost a 40 V input voltage to a 400 V output voltage with a measured 96.5% efficiency at 100 W output power. The observed circuit provides galvanic isolation. As shown in FIG. 6A, the primary-side (input-side) connection of semiconductor switching devices $Q_1$, $Q_2$, $Q_3$, $Q_4$ in the DC transformer 605 can be described as a "full bridge" or "H-bridge" configuration. In one embodiment, semiconductor switching devices $Q_1$, $Q_2$, $Q_3$, $Q_4$ are MOSFETs. In another embodiment, the semiconductor switching devices may be configured as a half-bridge circuit, as shown by switching devices $Q_3$, $Q_4$ in FIG. 3.

A controller 615 sends logic signals to gate drivers 610A and 610A. Based on logic signals received from the controller 615, gate driver 610A outputs signals to switching devices $Q_1$ and $Q_2$ and control their on/off states. Similarly, based on logic signals received from the controller 615, gate driver 610B outputs signals to switching devices $Q_3$ and $Q_4$ and control their on/off states. In one embodiment, the controller 615 begins a switching period $T_s$ by sending signals to gate drivers 610A and 610B, directing them to have switching devices $Q_1$ and $Q_4$ conduct simultaneously during a first interval of duration $t_p$. Typical waveforms for one embodiment of the DC transformer 605 are illustrated in FIG. 6B. As illustrated in FIG. 6B, $t_p=(T_s/2-t_d)$ where $t_d$, also referred to as a dead time, is a duration during which all switching devices $Q_1$, $Q_2$, $Q_3$, $Q_4$ are off.

During the first interval (Interval 1), instantaneous power is transmitted from the low-voltage input $V_{lv}$, through the H-bridge to the transformer $T_1$ primary winding $i_{pri}$. A short second interval (Interval 2) comprises a dead time of duration $t_d$. The dead time of the second interval prevents switches $Q_1$ and $Q_2$ (as well as $Q_3$ and $Q_4$) from conducting simultaneously. The dead time $t_d$ is typically no longer than five percent of the switching period $T_s$, thus the switches can couple the low-voltage input $V_2$ to the primary winding 95% of a switching cycle of the switching circuitry. During the second interval (the first dead time $t_d$), the H-bridge applies essentially zero voltage to the transformer primary winding $i_{pri}$, and hence negligible power is transmitted through the H-bridge to the transformer $T_1$. The second half of the period $T_s$ (the third and fourth intervals) is symmetrical to the first half of the period $T_s$. During the third interval, MOSFETs $Q_2$ and $Q_3$ conduct simultaneously while switches $Q_1$ and $Q_4$ are off; the third interval (Interval 3) also has a duration $t_p=(T_s/2-t_d)$. The switching period $T_s$ ends with a fourth interval (Interval 4), which is another short dead time of length $t_d$ during which no switching devices $Q_1$, $Q_2$, $Q_3$, $Q_4$ conduct. The entire process repeats with switching period $T_s$.

Antiparallel diodes $D_1$, $D_2$, $D_3$, and $D_4$ are preferably the body diodes of switching devices $Q_1$, $Q_2$, $Q_3$, $Q_4$ or alternatively are Schottky diodes; these diodes conduct during the dead times $t_d$ (the second and fourth intervals of FIG. 6B). Transformer $T_1$ is preferably wound on a low-loss ferrite core; interleaving of windings and/or use of Litz wire minimizes the proximity losses of this device. In some embodiments of the DC transformer 605, an additional dc blocking capacitor (not shown) is inserted in series with the transformer primary winding $i_{pri}$ to prevent saturation of the transformer core. The additional dc blocking capacitor, if inserted in series with the transformer primary winding, has a large capacitance, so that the additional dc blocking capacitor voltage has negligible ac variance. Diodes $D_5$, $D_6$, $D_7$, and $D_8$ are preferably ultrafast diodes rated to withstand the maximum dc output voltage $V_b$.

One embodiment of the DC transformer 605 has a substantially fixed ratio between the input voltage $V_2$ and the output voltage $V_b$. For example, the output voltage $V_b$ may be approximately equal to $V_2$, multiplied by n, where n is the turns ratio of transformer $T_1$. Conversely, if the output voltage $V_b$ is fixed (e.g., the output of the DC transformer 605 is coupled to a fixed voltage at a DC bus 525), then the input voltage $V_{lv}$ is approximately equal to $V_b/n$. For example, if $V_b$ is fixed at a voltage of 400 V dc, and a series-connected loop of PV shingles 105 produces a nominal maximum power point voltage of 20 V, then a turns ratio of n=400/20=20 can be employed in the DC transformer 605 to set $V_b$ at approximately 20 V.

In one embodiment of the DC-DC converter 120, a fixed voltage conversion ratio is acceptable for the DC transformer 605 because the voltage output of the series-connected PV shingles 105 is known to be within a limited range because of a DC-DC boost converter 320 coupled to the output of the series-connected PV shingles 150 which steps up the voltage from the series-connected PV shingles 105 to an approximately fixed intermediate value that is received by the DC transformer 605.

One embodiment of the DC transformer 605 achieves high efficiency in part through maximization of the portion of the switching period $T_s$ that instantaneous power is transmitted from the low-voltage input $V_2$ to the transformer $T_1$ (through the H-bridge and any additional primary-side components). In embodiments wherein the ratio of $V_2$ to $V_b$ is substantially fixed, then the transformer turns ratio n can be chosen as noted above. This minimizes the value of n as there is no need for extra turns to accommodate a variable range of voltage conversion ratios and also minimizes the primary-side rms currents. With the exception of the small dead times of duration $t_d$, power is continuously transmitted from the low-voltage source to the transformer, either by simultaneous conduction of switches $Q_1$ and $Q_4$ during the first interval or by simultaneous conduction of switches $Q_2$ and $Q_3$ during the third interval.

Minimization of the dead time durations $t_d$ minimizes the primary-side rms currents for the transformer $T_1$ and associated power losses. To illustrate this effect, consider the average power over a switching cycle $T_s$ while assuming that the instantaneous power during the first interval (Interval 1 in FIG. 6B) is equal to the instantaneous power during the third interval (Interval 3 in FIG. 6B). These instantaneous powers (equal to the instantaneous transformer voltage multiplied by the instantaneous transformer current) are approximately constant during Intervals 1 and 3 because the transformer current and voltage are approximately constant during these intervals, as illustrated in FIG. 6D. The average power over the switching cycle $T_s$ is slightly less that the instantaneous power during the first and third intervals because the instantaneous power is zero during the dead times (Interval 2 and Interval 4 in FIG. 6B), bringing down the average. The longer the duration $t_d$ of the dead times, the more the average power over the switching cycle $T_s$ is reduced relative to the instaneous power during the first and third intervals. Hence, for a desired average power over the switching cycle $T_s$, minimizing the duration $t_d$ of the dead times allows reduction of the instaneous power during the first and third intervals. In turn, reducing the instantaneous power during the first and third intervals allows for reduction of transformer $T_1$ currents which minimizes the primary-side rms currents and associated power losses, thereby improving efficiency of the DC transformer 605.

In contrast to the DC transformer 605, conventional approaches for PV power generation systems utilize conventional dc-dc conversion circuitry that operates with a variable voltage ratio and, if the conventional DC-DC conversion circuitry includes a transformer, therefore must employ a transformer with a large turns ratio that would accommodate for the maximum expected value of $V_b/V_2$. To obtain other voltages, a controller for such conventional dc-dc conversion circuitry reduces the duty cycle of the circuit, i.e., the fraction of time that power is transmitted to the transformer. This leads to increased primary-side peak currents and power loss for the conventional DC-DC conversion circuitry: the reduced duty cycle increases the time when no power is transmitted to the transformer included in the conventional DC-DC conversion circuitry, and so to obtain a desired average power, the power and current must be increased during the remainder of the switching period when the switches are conducting. This increased peak power and current necessarily lead to increased losses in primary-side components for conventional dc-dc conversion circuitry.

An additional way in which one embodiment of the DC transformer 605 achieves high efficiency is through zero-voltage switching of the output-side diodes $D_5$, $D_6$, $D_7$, $D_8$. Switching loss caused by the reverse recovery process of high-voltage diodes can substantially degrade converter efficiency; hence, it is beneficial to avoid this loss mechanism in a PV power generation system. In one embodiment of the DC transformer 605, the high-voltage diodes $D_5$, $D_6$, $D_7$, $D_8$ are connected directly to output filter capacitor $C_2$ with no intervening filter inductor. The absence of an intervening filter inductor between the high-voltage diodes $D_5$, $D_6$, $D_7$, $D_8$ and the output filter capacitor $C_2$ allows the diodes $D_5$, $D_6$, $D_7$, $D_8$ to be operated with zero voltage switching, as explained below with reference to FIG. 6C. The transformer $T_1$ leakage inductance limits the rate at which the diode current changes. Some embodiments of the DC transformer 605 also operate the primary-side MOSFETs $Q_1$, $Q_2$, $Q_3$, $Q_4$ with zero-voltage switching. However, since these switches $Q_1$, $Q_2$, $Q_3$, $Q_4$ operate at low voltage $V_2$, their switching losses dissipate less power than the switching losses at the secondary-side diodes $D_5$, $D_6$, $D_7$, $D_8$.

FIG. 6C illustrates the transformer secondary-side voltage and current waveforms, for one embodiment of the dc transformer in which the secondary diodes $D_5$, $D_6$, $D_7$, $D_8$ operate with zero-voltage switching. The time axis is magnified to illustrate the switching of the secondary diodes $D_5$, $D_6$, $D_7$, $D_8$ during the transition lasting from the end of Interval 1 to a short time after the beginning of Interval 3. In this diagram, MOSFETs $Q_1$ and $Q_4$ and diodes $D_5$ and $D_8$ initially conduct during Interval 1. When the controller 615 commands gate drivers 610a, 610b to turn off MOSFETs $Q_1$ and $Q_4$ at the end of Interval 1 (i.e., the beginning of Interval 2), the transformer $T_1$ secondary current 40 begins to fall at a rate determined by the transformer $T_1$ leakage inductance and the applied transformer voltages. However, diodes $D_5$ and $D_8$ continue to conduct because $i_s(t)$ is positive. Once 40 becomes negative, the diode reverse-recovery process begins. Diodes $D_5$ and $D_8$ continue to conduct while their stored minority charge is removed by the negative current $i_s(t)$, and the current $i_s(t)$ continues to decrease. After the diode stored minority charge has been removed, diodes $D_5$ and $D_8$ become reverse-biased. The current 40 then discharges the parasitic output capacitances of the four reverse-biased diodes $D_5$, $D_6$, $D_7$, $D_8$ causing the voltage across the secondary of transformer $T_1$, shown in FIG. 6C as $v_s(t)$, to change from $+V_b$ to $-V_{hv}$. When $v_s(t)$ reaches $-V_b$ then diodes $D_6$ and $D_7$ become forward-biased. One manner in which some embodiments of the DC transformer 605 differ from conventional DC-DC conversion techniques is by the above-described diode zero-voltage switching process, eliminating switching losses normally induced by the diode reverse-recovery process.

Another manner in which the DC transformer 605 achieves high efficiency is through design aspects of the transformer T1 that minimize losses induced by the proximity effect. The proximity effect is a loss mechanism by which an ac current in a transformer conductor induces an eddy current in an adjacent conductor. In various embodiments, the proximity effect is minimized in transformer $T_1$ in part by one or more of the following design features. First, the number of windings is minimized because one embodiment of the DC transformer 605 requires only a single primary winding and a single secondary winding, with no center taps or other windings. Second, the winding geometry is optimized for minimum proximity loss using techniques such as multi-stranded (Litz) wire and interleaving of windings. Third, the converter circuit applies near-optimal current waveforms to the transformer windings; as illustrated in FIG. 6D, the primary and secondary currents are trapezoidal with low peak values, and are in phase, thereby minimizing the winding currents for the given output power.

FIG. 6D illustrates the voltage and current waveforms for the primary-side and secondary-side of the transformer, for one embodiment of the dc transformer in which the secondary diodes $D_5$, $D_6$, $D_7$, $D_8$ operate with zero-voltage switching. The waveforms illustrate the switching of the secondary diodes $D_5$, $D_6$, $D_7$, $D_8$ during Intervals 1 through 4 and during subsequent intervals. Referring to FIGS. 6A and 6D together, MOSFETs $Q_1$ and $Q_4$ and diodes $D_5$ and $D_8$ initially conduct during Interval 1. When the controller 615 commands gate drivers 610A and 610B to turn off MOSFETs $Q_1$ and $Q_4$ at the end of Interval 1 (i.e., the beginning of Interval 2), the primary voltage $v_p(t)$ begins to decrease from $+V_2$ to $-V_2$ and the primary current, $i_{pri}(t)$, and the secondary current, $i_s(t)$, of the transformer $T_1$ begin to fall at a rate determined by the transformer $T_1$ leakage inductance and the applied transformer voltages. While the decreasing primary current $i_{pri}(t)$ remains positive, the secondary current 40 also remains positive, causing diodes $D_5$ and $D_8$ to continue conducting. Once the primary current $i_{pri}(t)$ and the secondary current $i_s(t)$ become negative, the diode reverse-recovery process begins.

During the diode reverse-recovery process, diodes $D_5$ and $D_8$ continue to conduct while their stored minority charge is removed by the negative secondary current 40, and the secondary current 40 continues to decrease. Diodes $D_5$ and $D_8$ become reverse-biased after the diode stored minority charge has been removed. The secondary current 40 then discharges the parasitic output capacitances of the four reverse-biased diodes $D_5$, $D_6$, $D_7$, $D_8$ causing the voltage across the secondary of transformer $T_1$, shown in FIG. 6D as $v_s(t)$, to change from $+V_b$ to $-V_b$. When $v_s(t)$ reaches $-V_b$, diodes $D_6$ and $D_7$ become forward-biased and start conducting.

When the controller 615 commands gate drivers 610A and 610B to turn off MOSFETs $Q_1$ and $Q_4$, the controller 615 initiates a resonant interval where the capacitances of MOSFETs $Q_1$ and $Q_4$ and the capacitances of diodes $D_1$ and $D_4$ are discharged by the transformer $T_1$ leakage inductance. Diodes $D_2$ and $D_3$ then become forward-biased, allowing the gate drivers 610A, 610B to turn on MOSFETs $Q_2$ and $Q_3$ with zero-voltage switching. The controller 615 initiates a similar resonant interval when turning off MOSFETs $Q_2$ and $Q_3$ to allow zero-voltage switching of MOSFETs $Q_1$ and $Q_4$ after forward-biasing using diodes $D_1$ and $D_4$.

When MOSFETs $Q_2$ and $Q_3$ turn off, the primary voltage $v_p(t)$ begins increasing from $-V_2$ to $+V_2$, with MOSFETs $Q_1$ and $Q_4$ turning on when the primary voltage reaches $+V_2$, and the primary current, $i_{pri}(t)$, and the secondary current, $i_s(t)$, of the transformer $T_1$ also begin increasing at a rate determined by the transformer $T_1$ leakage inductance and the applied transformer voltages. While the increasing primary current $i_{pri}(t)$ and increasing secondary current 40 remain negative, diodes $D_6$ and $D_7$ continue to conduct. Once the primary current $i_{pri}(t)$ and the secondary current 40 become positive, the diode reverse-recovery process begins for diodes $D_6$ and $D_7$.

During the diode reverse-recovery process, diodes $D_6$ and $D_7$ continue to conduct while their stored minority charge is removed by the positive secondary current $i_s(t)$, which continues to increase. Diodes $D_6$ and $D_7$ become reverse-biased after the diode stored minority charge has been removed. The secondary current $i_s(t)$ then discharges the parasitic output capacitances of the four reverse-biased diodes $D_5$, $D_6$, $D_7$, $D_8$ causing the voltage across the secondary of transformer $T_1$, $v_s(t)$, to change from $-V_b$ to $+V_b$. When $v_s(t)$ reaches $+V_b$, diodes $D_5$ and $D_8$ become forward-biased and conduct. The above-described process is repeated over multiple cycles of the switching circuitry. The zero-voltage diode switching process eliminates switching losses normally induced in the MOSFETs $Q_1$, $Q_2$, $Q_3$, $Q_4$ by the diode reverse-recovery process, such as losses caused by current spikes from conventional diode hard-switching techniques. Additionally, zero-voltage switching of the MOSFETs $Q_1$, $Q_2$, $Q_3$, $Q_4$ eliminates switching losses associated with energy stored in the MOSFET output capacitances and/or with the reverse recovery process of the MOSFET $Q_1$, $Q_2$, $Q_3$, $Q_4$ body diodes. During the dead time in switching between MOSFETs $Q_1$, $Q_2$, $Q_3$ and $Q_4$, the current of the transformer T1 leakage inductance discharges the MOSFET output capacitances and recovers their stored energies. Additional discrete inductance optionally may be added in series with the transformer to assist in this process.

Because the ratio $V_b/V_2$ is substantially the same as the turns ratio of the transformer T1 and also because of the minimal dead time in switching between MOSFETs $Q_1$, $Q_2$, $Q_3$ and $Q_4$, the current waveforms of the transformer T1 result in improved efficiency. As shown by FIG. 6D, the primary current $i_{pri}(t)$ and secondary current $i_s(t)$ waveforms have a trapezoidal shape that is substantially continuous without spikes or abrupt changes. Because of its trapezoidal waveform, the primary current $i_{pri}(t)$ does not include current spikes, nor does the primary current $i_{pri}(t)$ substantially exceed the dc input current to the DC transformer 605 coming out of the PV panel 510. Similarly, because of its trapezoidal waveform, the secondary current $i_s(t)$ does not include current spikes, nor does the secondary current $i_s(t)$ substantially exceed the dc output current from the DC transformer 605 to the dc bus 525. Consequently, the transformer T1 current waveforms exhibit minimal peak amplitudes relative to the converter power throughput, and hence the transformer losses are reduced.

Alternative Configurations

Figure 7:
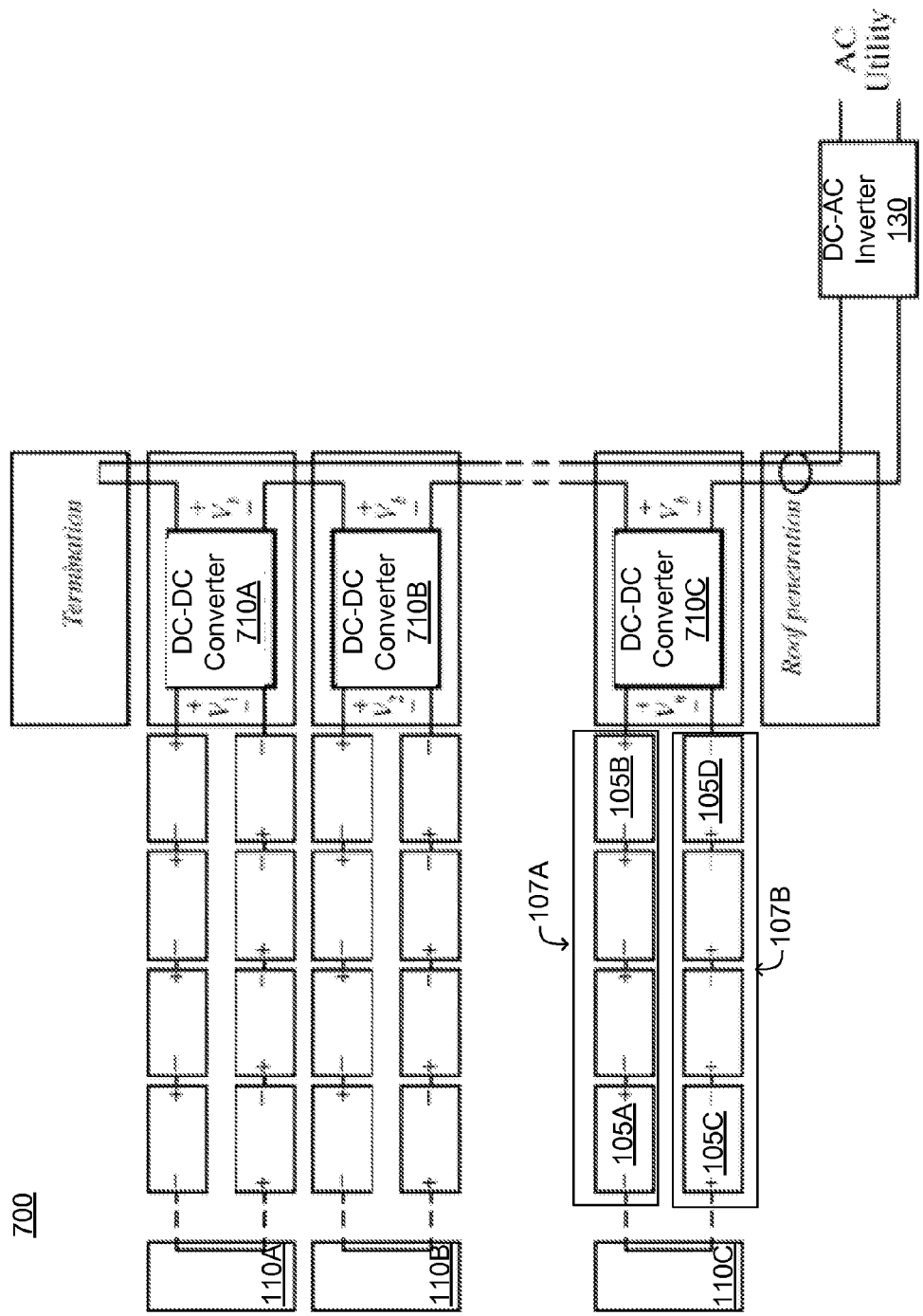
FIG. 7 illustrates an alternative embodiment of a rooftop photovoltaic (PV) power generation system where DC-DC converters are connected in series.

FIG. 7 illustrates an alternative embodiment of a rooftop photovoltaic (PV) power generation system 700 where DC-DC converters 710A, 710B, 710C (also referred to individually and collectively as 710) are connected in series. While the DC-DC converters 710 are also connected to rows 107 of one or more PV series-connected PV shingles 105, which may be connected together via a connector single 110, the outputs of the DC-DC converters are connected in series, rather than in parallel as shown in FIG. 1.

Connecting the outputs of the DC-DC converters 710 in series relieves the DC-DC converters 710 of increasing the voltage from the series-connected PV shingles 105 by a large ratio. This allows implementation of the DC-DC converters 710 using simpler buck, boost or buck-boost converters without including transformers. However, connecting DC-DC converter 710 outputs makes the PV power generation system 700 less tolerant of mismatches between the number of PV shingles 105 and the input voltage of the DC-DC inverter 130.

Figure 8:
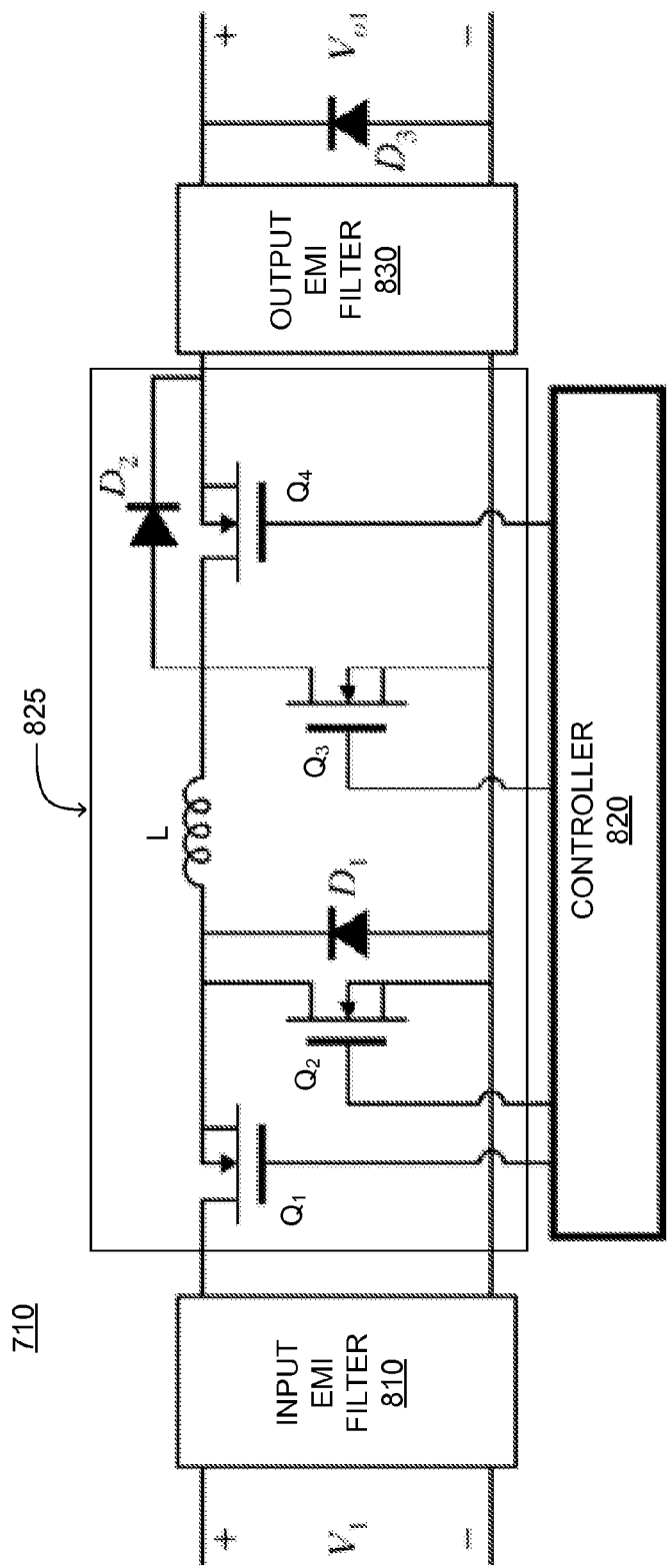
FIG. 8 illustrates an embodiment of a DC-DC converter including a noninverting buck-boost converter.

FIG. 8 illustrates an embodiment of a DC-DC converter 710 used in the alternative PV power generation system 700. The DC-DC 710 converter including a noninverting buck-boost converter 825. In the embodiment shown by FIG. 8, an input EMI filter 810 filters voltage $V_1$ from series-connected PV shingles 105 and the filtered voltage is stepped up by the noninverting buck-boost converter 825. As shown in FIG. 8, the noninverting buck-boost converter includes a plurality of semiconductor switching devices $Q_1$, $Q_2$, $Q_3$, $Q_4$ such as MOSFETs, an inductor L and diodes $D_1$, $D_2$ connected as known in the art. A controller 820 generates control signals to operate the semiconductor switching devices $Q_1$, $Q_2$, $Q_3$, $Q_4$. The output of the noninverting buck-boost converter 825 is filtered by an output EMI filter 830 and the output voltage $V_{o1}$ is transmitted to a DC bus.

Figure 9:
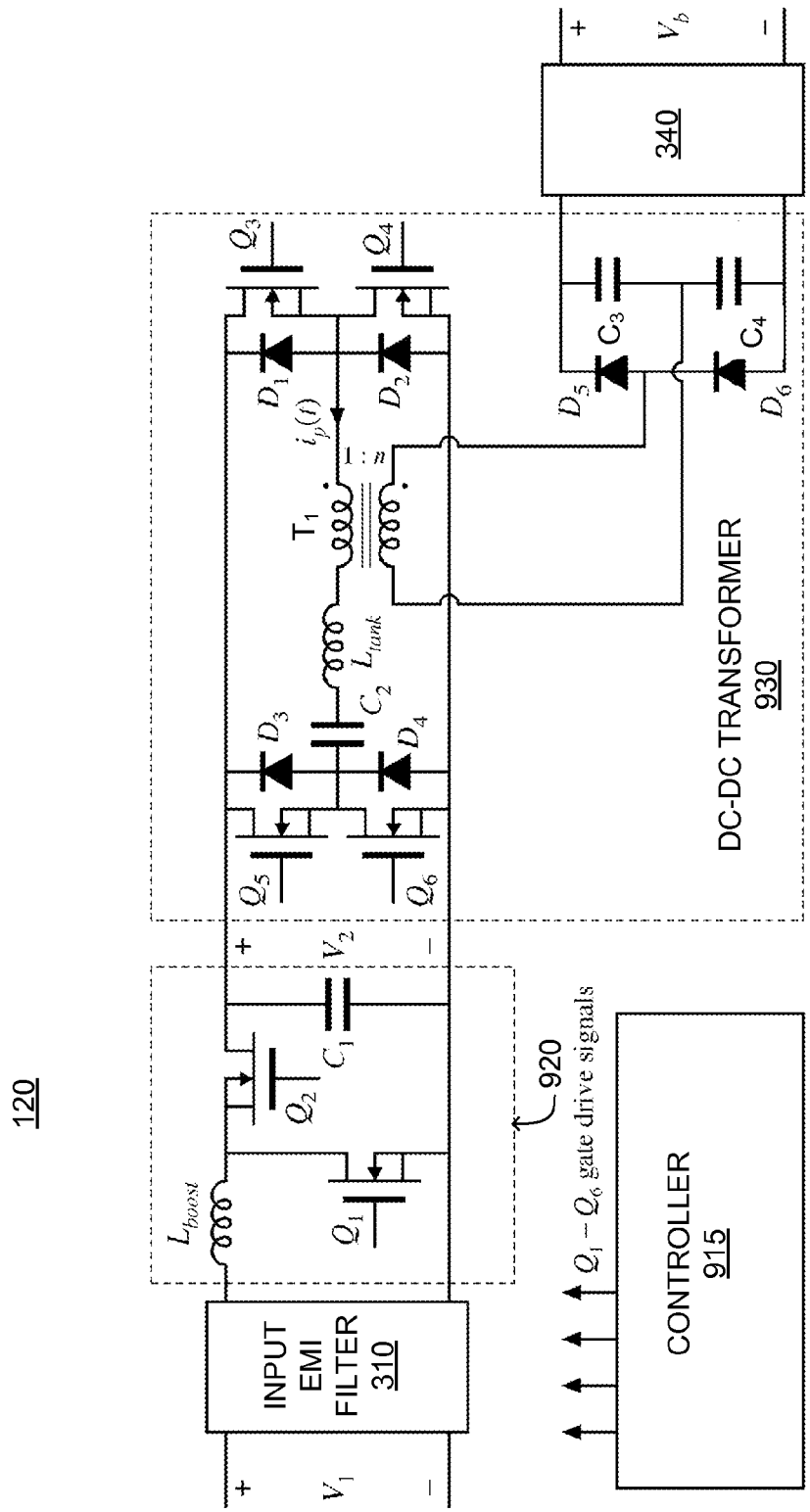
FIG. 9 illustrates one embodiment of a DC-DC converter including a primary-side full-bridge circuit and a secondary-side doubler circuit.

FIG. 9 illustrates one embodiment of a DC-DC converter 120 including a primary-side full-bridge circuit and a secondary-side doubler circuit. As shown in FIG. 9, the DC-DC converter 120 includes a boost converter 920 that receives an input voltage from an input EMI filter 310. The boost converter 920 includes a capacitor $C_1$ coupled to the inductor $L_{boost}$ and semiconductor switching devices $Q_1$, $Q_2$ as known in the art. An output voltage V2 from the boost converter 920 is increased by the DC-DC transformer 930, which includes a primary-side full-bridge circuit as further described above in conjunction with FIG. 6A. The secondary-side of the transformer $T_1$ of the DC-DC transformer 930 is coupled to a doubler circuit comprising a plurality of diodes $D_5$, $D_6$ and a plurality of capacitors $C_3$, $C_4$ connected as known in the art. The output of the doubler circuit is filtered by an output EMI filter 340 and transmitted to the DC bus. A controller 915 provides control signals to control the semiconductor switching devices $Q_1$, $Q_2$, $Q_3$, $Q_4$, $Q_5$, $Q_6$.

Figure 10:
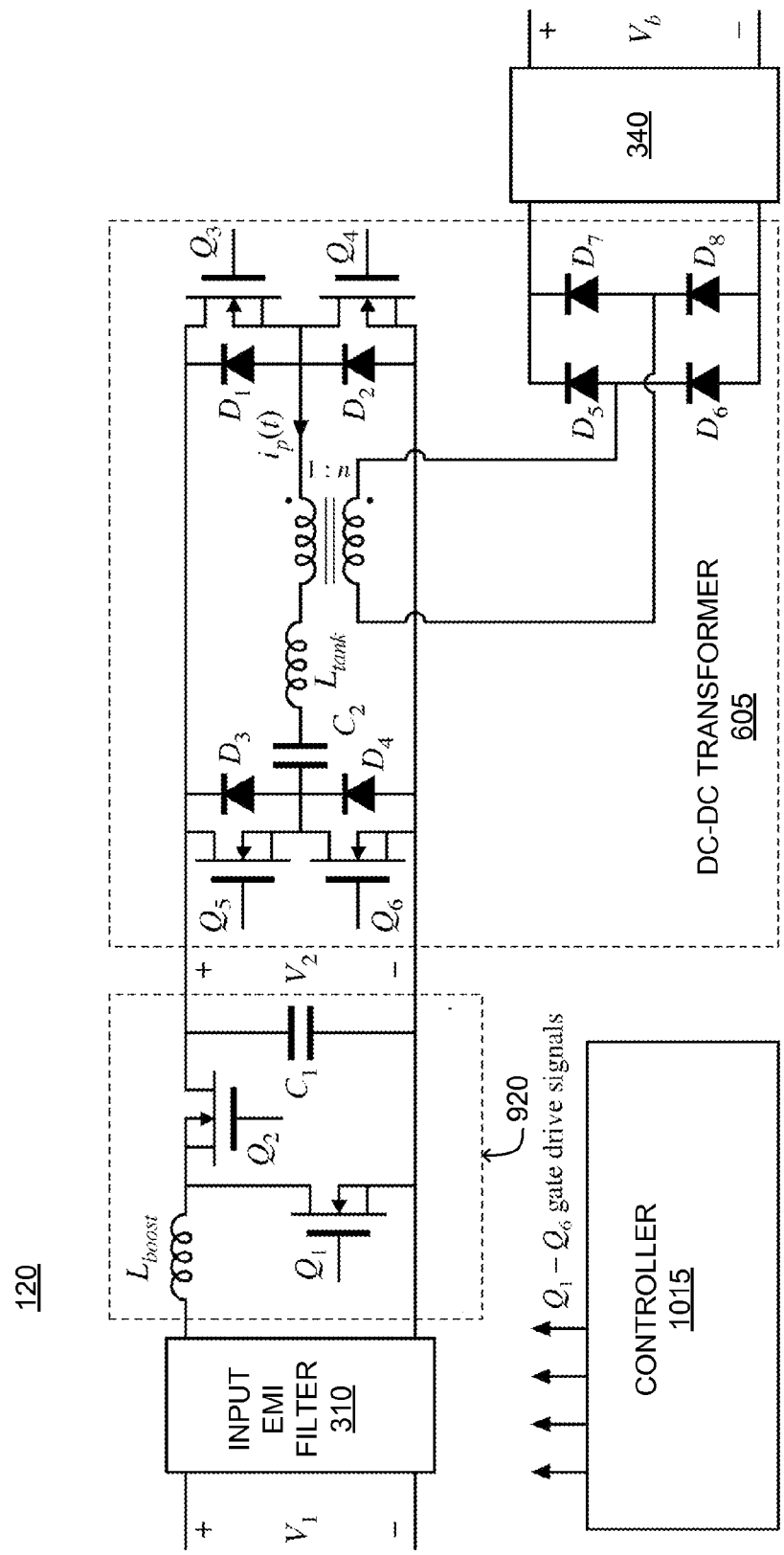
FIG. 10 illustrates one embodiment of a DC-DC converter including a primary-side full-bridge circuit and a secondary-side full-wave rectifier circuit.

FIG. 10 illustrates one embodiment of a DC-DC converter 120 including a primary-side full-bridge circuit and a secondary-side full-wave rectifier circuit. As shown in FIG. 10, the DC-DC converter 120 includes a boost converter 920 that receives an input voltage from an input EMI filter 310. The boost converter 920 includes a capacitor $C_1$ coupled to the inductor $L_{boost}$ and semiconductor switching devices $Q_1$, $Q_2$ as known in the art. An output voltage V2 from the boost converter 920 is increased by the DC-DC transformer 930, which includes a primary-side full-bridge circuit as further described above in conjunction with FIG. 6A. The secondary-side of the transformer $T_1$ of the DC-DC transformer 930 is coupled to a full-wave rectifier circuit comprising a plurality of diodes $D_5$, $D_6$, $D_7$, $D_8$ connected as known in the art. The output of the full-wave rectifier circuit is filtered by an output EMI filter 340 and transmitted to the DC bus. A controller 1015 provides control signals to control the semiconductor switching devices $Q_1$, $Q_2$, $Q_3$, $Q_4$, $Q_5$, $Q_6$.

Figure 11:
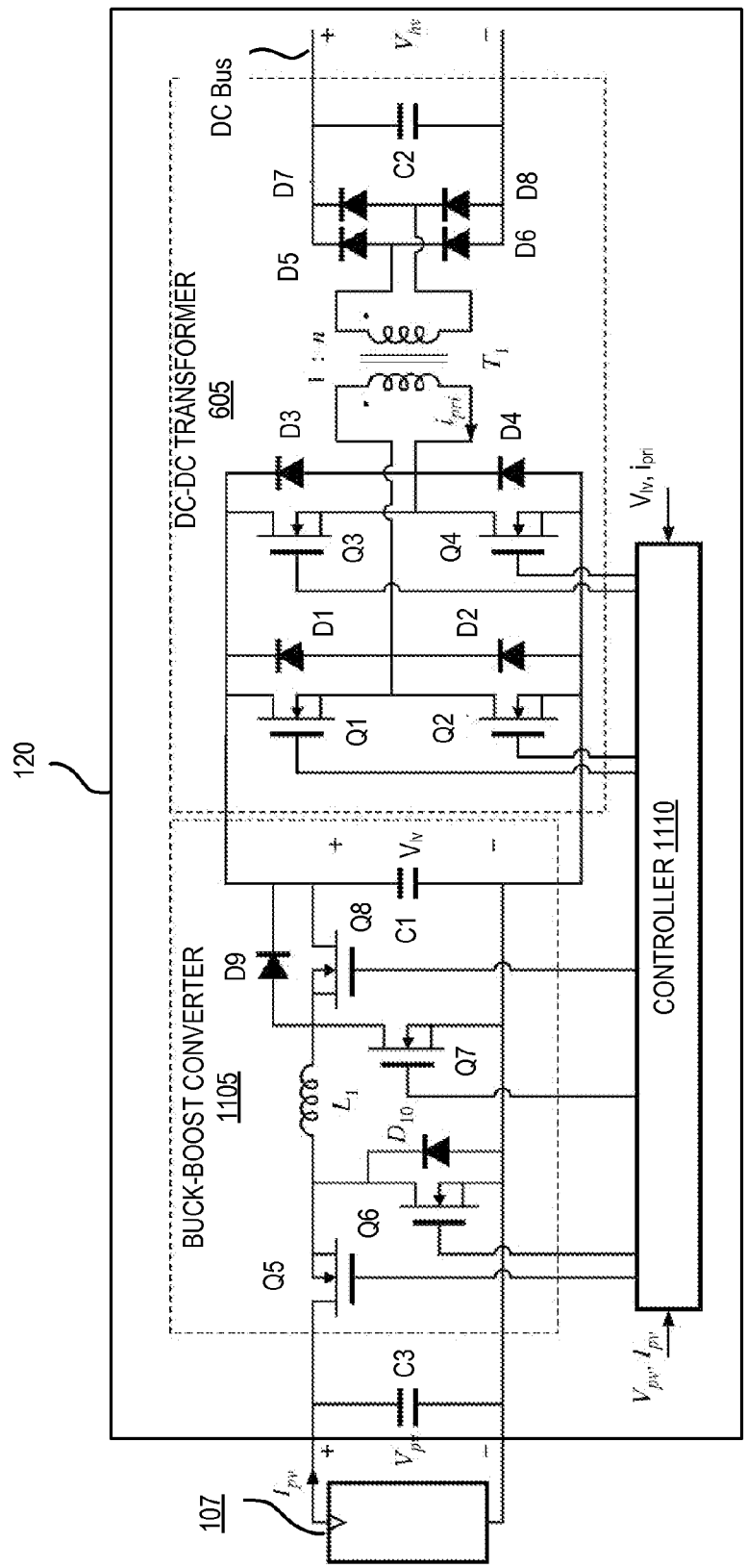
FIG. 11 illustrates an embodiment of a DC-DC converter including a buck-boost converter.

FIG. 11 illustrates an embodiment of a DC-DC converter 120 including a buck-boost converter 1105, a controller 1110, and a DC-DC transformer 605. An input of the DC-DC converter 120 is coupled to one or more rows 107 of PV shingles 105 and an output of the DC-DC converter 120 is coupled to a DC bus. The buck-boost converter 1105 is a conventional one comprising switching devices $Q_5$, $Q_6$, $Q_7$, $Q_8$, diodes D9, D10 and an inductor $L_1$ coupled together as known in the art and allows the voltage from one or more rows 107 of PV shingles 105 to be increased or decreased. Use of a buck-boost converter 1105 allows the DC-DC 120 converter to operate at a high efficiency with a wider range of input voltages than if only a boost stage were used. The controller 1110 provides control signals to control the semiconductor switching devices $Q_1$, $Q_2$, $Q_3$, $Q_4$, $Q_5$, $Q_6$, $Q_7$, $Q_8$.

Upon reading this disclosure, those of skill in the art will appreciate still additional alternative structural and functional designs for a system and a process for providing a rooftop photovoltaic (PV) power generation system through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A photovoltaic power generation system comprising:
a first set of photovoltaic shingles connected in series and configured to generate a first DC voltage at its output, each photovoltaic shingle including one or more photovoltaic cells;
a first DC-DC converter coupled to the output of the first set of photovoltaic shingles, the first DC-DC converter configured to receive the first DC voltage and generate a first output DC voltage;
a second set of photovoltaic shingles connected in series and configured to generate a second DC voltage at its output, each photovoltaic shingle including one or more photovoltaic cells;
a second DC-DC converter coupled to the output of the second set of photovoltaic shingles, the second DC-DC converter configured to receive the second DC voltage and generate a second output DC voltage;
wherein the outputs of the first DC-DC converter and the second DC-DC converter are coupled in parallel to a DC bus,
wherein the first DC-DC converter is integrated into a roof shingle and comprises a planar matrix transformer comprising a plurality of low profile planar magnetic cores connected in a series-parallel arrangement, and
wherein a thickness of the first DC-DC converter is no greater than ⅜ inch.

2. A DC-DC converter coupled to an output of a first set of photovoltaic shingles that are connected in series, the DC-DC converter comprising:
a converter configured to receive a first DC voltage from the output of the first set of photovoltaic shingles and generate an intermediate DC voltage;
a dc transformer configured to receive the intermediate DC voltage from the converter output a second DC voltage, the dc transformer including:
a transformer including a primary winding and a secondary winding;
switching circuitry coupled between the output of the converter and the primary winding of the transformer, the switching circuitry configured to convert the intermediate DC voltage to a first AC voltage at the primary winding of the transformer; and
circuitry coupled between the secondary winding and a DC bus and configured to convert a second AC voltage across the secondary winding to the second DC voltage at the bus,
wherein the transformer comprises a planar matrix transformer comprising multiple low profile planar magnetic cores connected in a series-parallel arrangement and wherein a thickness of the DC-DC converter is no greater than ⅜ inch and the DC-DC converter is integrated into a roof shingle.

3. A photovoltaic power generation system comprising:
a first set of photovoltaic shingles connected in series and configured to generate a first DC voltage at its output, each photovoltaic shingle including one or more photovoltaic cells;
a first DC-DC converter coupled to the output of the first set of photovoltaic shingles, the first DC-DC converter configured to receive the first DC voltage and generate a first output DC voltage;
a second set of photovoltaic shingles connected in series and configured to generate a second DC voltage at its output, each photovoltaic shingle including one or more photovoltaic cells;
a second DC-DC converter coupled to the output of the second set of photovoltaic shingles, the second DC-DC converter configured to receive the second DC voltage and generate a second output DC voltage;
wherein the outputs of the first DC-DC converter and the second DC-DC converter are coupled in series to a DC bus,
wherein the first DC-DC converter is integrated into a roof shingle and comprises a planar matrix transformer comprising a plurality of low profile planar magnetic cores connected in a series-parallel arrangement; and
wherein a thickness of the first DC-DC converter is no greater than ⅜ inch.

4. The system of claim 1, wherein a profile of the roof shingle is no greater than ⅜ inch.

5. The system of claim 1, wherein the roof shingle further comprises one or more embedded photovoltaic cells.

6. The system of claim 3, wherein a profile of the roof shingle is no greater than ⅜ inch.

7. The system of claim 3, wherein the roof shingle further comprises one or more embedded photovoltaic cells.

* * * * *